June 2, 1942.　　　G. TRAUTVETTER　　　2,284,697
METHOD OF MAKING SHEET-MATERIAL PARTS
Filed Jan. 27, 1938
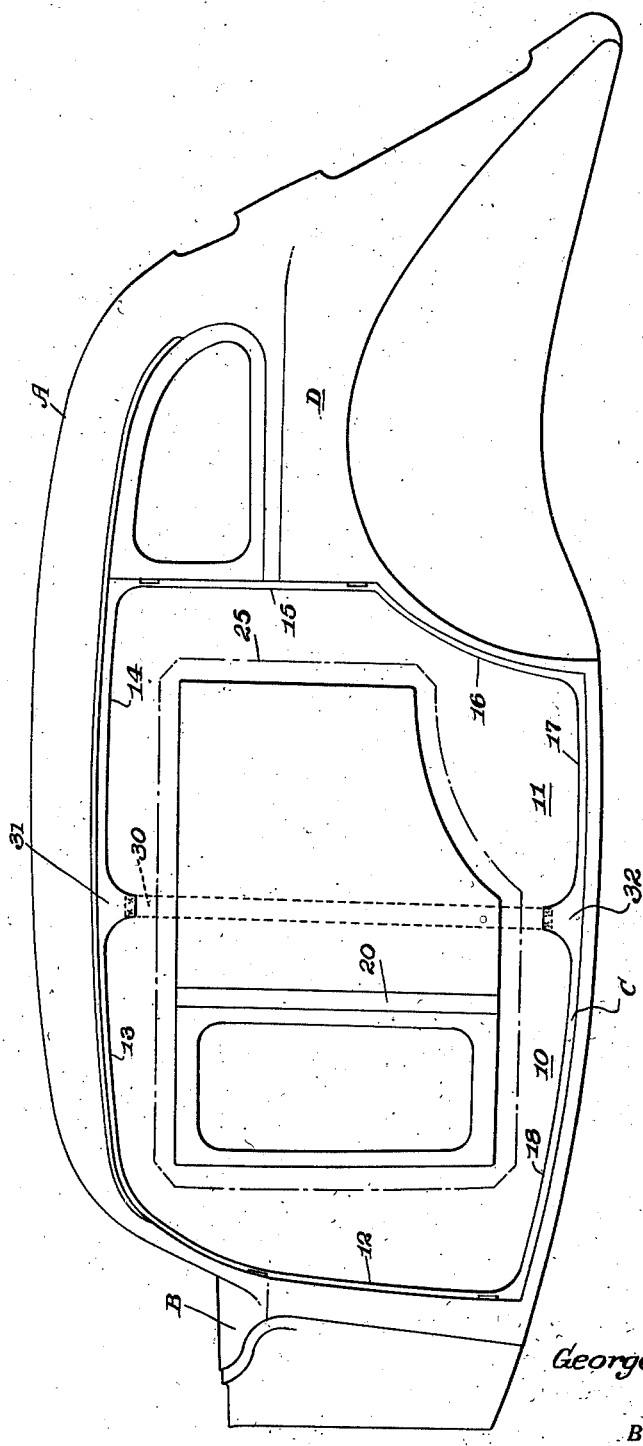
INVENTOR.
George Trautvetter
BY
ATTORNEY.

Patented June 2, 1942

2,284,697

UNITED STATES PATENT OFFICE 2,284,697

METHOD OF MAKING SHEET-MATERIAL PARTS

George Trautvetter, Philadelphia, Pa., assignor to Edward G. Budd Manufacturing Company, Philadelphia, Pa., a corporation of Pennsylvania Application January 27, 1938, Serial No. 187,127

4 Claims. (Cl. 113—116)

This invention relates to a method of making parts of a wall, such as of an automobile body side wall, out of sheet material.

The aim of automobile body engineers has been for some time directed to the reduction of wastage of pressed metal in the methods employed in the fabrication of bodies. A body of sheet steel stampings is peculiarly adapted for the attainment of this end, and it is the general object of the present invention to provide a construction of body made of sheet steel stampings whereby this aim is fulfilled in a very high degree.

In particular, the invention is directed to a rear door for an automobile body of the mono-piece type, which door is to be fabricated out of pressed metal. The invention relates to a method of blanking a plurality of members from a single blank of sheet material, and more particularly to a method of manufacturing or procuring a blank for a rear door, from the material removed from said single blank of sheet material in the operation of forming the front and rear door openings of said mono-piece body stamping.

Heretofore, in the manufacture of body panel stampings, it has been the practice to blank such front and rear door openings, as separate and individual openings, divided by a door post, from a single piece of sheet material, with the result that such blanked out portions were necessarily discarded as waste material. Naturally such waste adds to the cost of making the body.

Now, I propose to combine the steps of manufacturing the body side panel and the rudimentary blank for the rear door together, whereby the wasted portion of said body side panel can be subsequently formed into a rear door panel. This results in a reduction in the cost of manufacturing the parts referred to.

Other objects and features of this invention will more fully appear from the following detailed description, taken in connection with the accompanying drawing, which illustrates a single embodiment of the invention, in which is shown a side elevation of the vehicle body.

The body side panel A taken as a whole may be substantially of known construction and is made by stamping from a single sheet of material, usually sheet metal. The stamping thus comprises a portion of a front or cowl unit B, the side unit C and a tonneau unit D, all however being integral.

The front door opening is represented as 10 and the rear door opening is represented as 11.

In stamping the body side panel, the sheet metal which comprises the area comprehended by the front and rear door openings is also stamped out, leaving the marginal edges 12, 13, 14, 15, 16, 17 and 18. In other words, the sheet metal thus removed as a single sheet would be wasted but for the fact that the method employed in stamping out this metal anticipated the use of this "waste" or removed metal as a blank for a rear door, to be used over the door opening 11. The "waste" or removed metal constitutes a rudimentary blank, from which the door panel 20 can be stamped by employing substantially any of the methods well known in the art.

The gist of this invention resides in the fact that the rudimentary blank consisting of door opening areas 10 and 11 is sufficient to supply enough metal from which a rear door panel can be stamped. However, it is important to observe that the attainment of such a blank is possible only because the "B—C" post 30 is not stamped at the same time that the body side panel is stamped. In stamping the body side panel, the marginal edge portions 13 and 14, 17 and 18 are provided with post attaching portions or projections 31 and 32, said projections being in vertical and planar alignment. After the door openings have been formed and the rudimentary door panel blank obtained, the "B—C" post 30, made according to a separate method, can be secured to the projections 31 and 32 by riveting, welding or the like.

It is to be noted that the rudimentary blank is sufficient to supply all metal needed in the formation of the door panel, the outer peripheral limits of which are shown by the line 25. After the door panel has been formed from the rudimentary blank, it is obvious that the remaining metal is wasted but this wasted metal by no means can compare, in amount, to the metal which was formerly wasted in following the stamping methods of the prior art. It is, relatively speaking, only a small proportion of that metal which was formerly wasted and hence the costs of making a body side panel and a rear door panel have been materially reduced.

In the annexed claims, I desire to claim all modifications of my invention which fall within the purview of its generic spirit.

I claim:

1. In the method of making a vehicle body side wall panel including front and rear door openings and a panel for a door of the same vehicle, the step of removing from a single blank of sheet material an integral portion sufficient to provide for the front and rear door openings, of forming said blank into a body side wall stamping, of forming said removed portion into a door panel, of forming separately a door post member and connecting such member with said side wall stamping as to separate the front and rear door openings from each other.

2. In the method of making a vehicle body side wall panel including front and rear door openings and a panel for a door of the same vehicle, one of said openings being provided with a wheel housing portion, the step of removing from a single blank of sheet material an integral portion sufficient to provide for the front and rear door openings, of forming said blank into a body side wall stamping, of forming said removed portion into a panel for the door to be fitted into the opening comprising the wheel housing section, of forming separately a door post member and connecting such member with said side wall stamping as to separate the front and rear door openings from each other.

3. In the method of making a side wall panel of a vehicle body from a single blank of sheet metal, said panel comprising a front and a rear door opening, the step of removing from the blank in a single sheet enough metal to provide an opening covering about the space of both the front and rear door openings, said sheet being free from interruptions and distortions incompatible with its subsequent use for the formation of another part, requiring a blank whose outline is greater than either the front or rear door opening, of forming said blank into said side wall panel in keeping the marginal edge portion of said opening free of any projections save at two points common to said front and rear door openings, said projections being in alignment and forming the adjacent corners of said front and rear door openings, of separately manufacturing a door post member common to said front and rear door openings and uniting it with said projections of the side wall panel.

4. In the method of making a wall for an automobile body side wall including more than one opening at least one to be filled in by a removable closure member such as a door, the operation of forming from one integral blank of sheet material a wall member integrally surrounding one great opening, said great opening covering substantially the area of said first named openings of the finished wall, said operation comprising cutting out a part of said blank which part extends into the area of at least two of said first-named openings so as to obtain a comparatively large cut out blank whose area is greater than the area of one of said openings adapted to be used for the formation of another member and practically free from interruptions and distortions incompatible with such use, and of forming separately a second wall member for and connecting it with said first named wall member between each two adjacent first-named openings.

GEORGE TRAUTVETTER.